Figure 2:
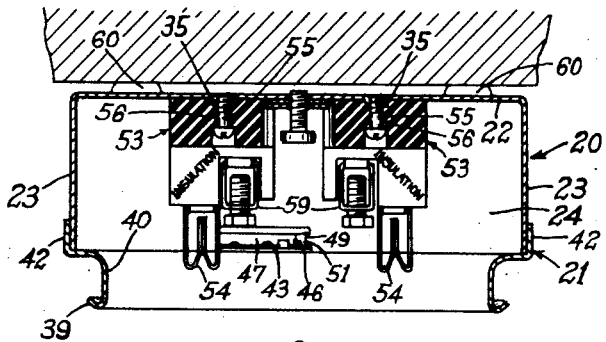

Nov. 30, 1954  V. J. LAJEUNESSE ET AL  2,695,923
SOCKET METER BOX
Filed Dec. 23, 1950  4 Sheets-Sheet 1

Inventors
Victor J. Lajeunesse
Raymond T. Trier and
Wilbur L. Espenschied
By
Attorneys Nov. 30, 1954  V. J. LAJEUNESSE ET AL  2,695,923
SOCKET METER BOX
Filed Dec. 23, 1950  4 Sheets-Sheet 2

Inventors
Victor J. Lajeunesse
Raymond T. Trier and
Wilbur L. Espenschied

By Freass and Bisley
Attorneys

Nov. 30, 1954 V. J. LAJEUNESSE ET AL 2,695,923
SOCKET METER BOX

Filed Dec. 23, 1950 4 Sheets-Sheet 3

Inventors
Victor J. Lajeunesse
Raymond T. Trier and
Wilbur L. Espenschied

Attorneys

Nov. 30, 1954  V. J. LAJEUNESSE ET AL  2,695,923
SOCKET METER BOX

Filed Dec. 23, 1950  4 Sheets-Sheet 4

Inventors
Victor J. Lajeunesse
Raymond T. Trier and
Wilbur L. Espenschied

By Freese & Bishof

Attorneys

United States Patent Office 2,695,923
Patented Nov. 30, 1954

2,695,923

SOCKET METER BOX

Victor J. Lajeunesse, Hills and Dales, Raymond T. Trier, North Canton, and Wilbur L. Espenschied, Canton, Ohio, assignors to The Superior Switchboard & Devices Company, Canton, Ohio, a corporation of Ohio Application December 23, 1950, Serial No. 202,496

6 Claims. (Cl. 174—52)

The invention relates to electric meter installations and more particularly to a socket meter box for receiving detachable meters such as watt hour meters.

Such watt hour meters for detachable mounting are provided with a plurality of contact blades, projecting from the rear side of the meter casing, and the enclosure is provided with a ring opening or socket for receiving the meter and the contact blades.

This socket contains a plurality of contact jaws, for detachably receiving the contact blades of the meter, and when the meter is mounted in position on the socket the meter itself closes the opening therein and the contact blades of the meter are received in said contact jaws.

Such a socket may take the form of a box having a detachable cover or closure provided with an opening surrounded by a ring flange for mounting the detachable meter. The present invention relates particularly to such socket meter boxes.

Under present practice a diametrically disposed bridge bar is connected to the underside of the cover, across said circular opening and adapted to be detachably connected to the insulation blocks in the box, upon which the contact jaws are mounted, by bolts, screws or the like to secure the cover upon the box and to rigidly hold the outer ends of the insulation blocks in such position as to accurately locate the contact jaws thereon in proper position to receive the blades of the meter.

This requires that, in order to remove the cover from the box, these screws, nuts or the like, which connect the bridge bar to the insulation blocks, must first be removed.

In the conventional construction of socket meter boxes above briefly described, there is danger of short circuiting the energized contact jaws, or terminal clips, within the box, by accidental contact of the cover with these contact jaws, when the cover is being removed from the box, which frequently causes property damage or personal injury.

When it is desired to have access to the interior of the box, the meter is first removed and then the bolts, screws or nuts attaching the bridge bar to the insulation blocks must be disengaged before the cover can be removed from the box.

When these bolts, screws or nuts are disconnected the cover may slide downwardly, and in so doing may come into contact with these energized contact jaws in the box, which may not only injure the operator but may also cause a short circuit through the cover between the contact jaws thus causing property damage.

Even though the cover may not accidently slide down into contact with the energized contact jaws, it is necessary that the operator be very careful in removing the cover so as not to permit the same to come into contact with the contact jaws.

It is therefore an object of the present invention to provide a socket meter box in which the bridge bar, across the opening in the cover, is eliminated in order to overcome certain of the objections above pointed out.

Another object is to provide a simple and efficient latch means for detachably connecting the cover to the box without requiring the use of a bridge bar or bolts, screws, nuts or the like for attaching the same to the insulation blocks.

A further object is to provide such a latch means which will be automatically operated to detachably connect the cover to the box when the cover is placed in position thereon.

A still further object is to provide simple and efficient locating means for positioning the insulation blocks in the box so as to accurately position the contact jaws carried thereby in position to receive the contact blades upon the meter.

It is another object of the invention to provide simple and efficient means for preventing the cover from coming into contact with the energized contact jaws in the box when the cover is being removed from or replaced upon the box.

Figure 1:
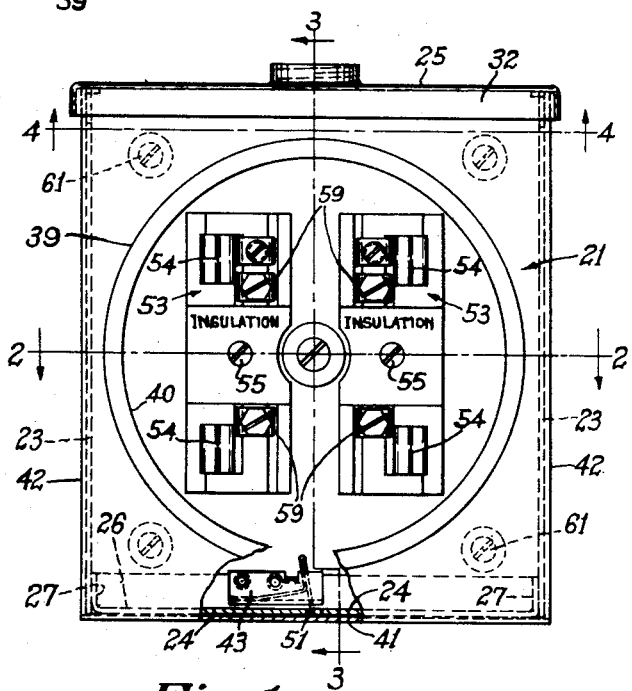
Figure 3:
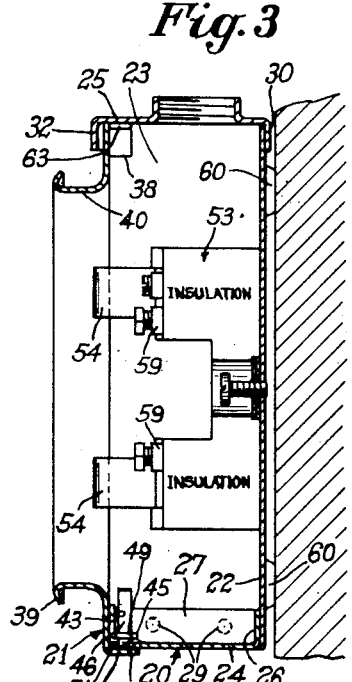
Figure 4:
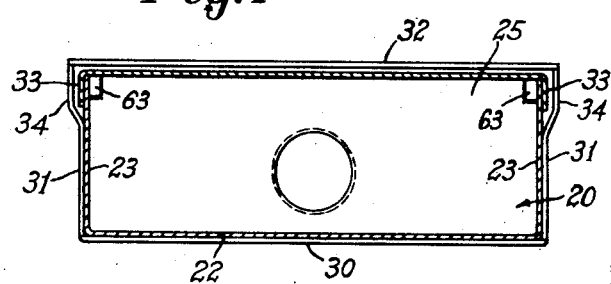
Figure 5:
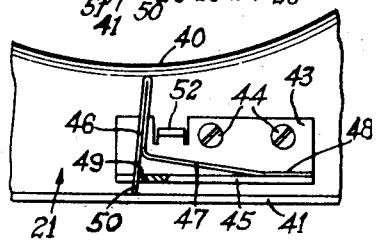
Figure 6:
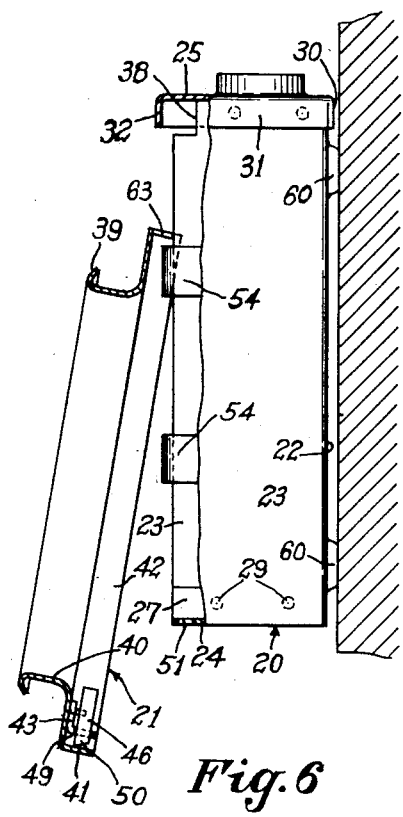
Figure 7:
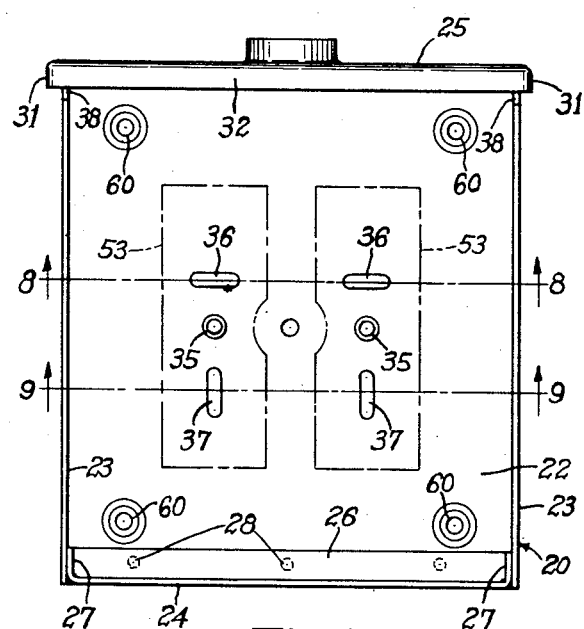
Figure 8:
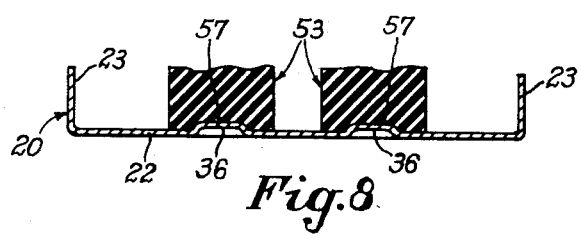
Figure 10:
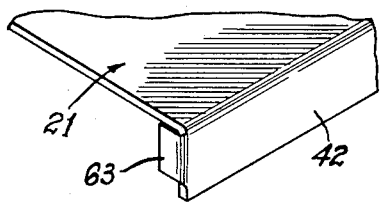
Figure 9:
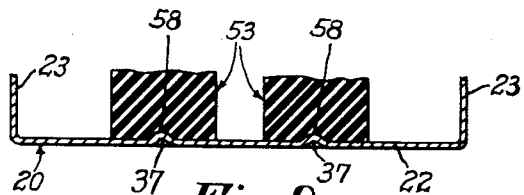
Figures 11, 12, 13:
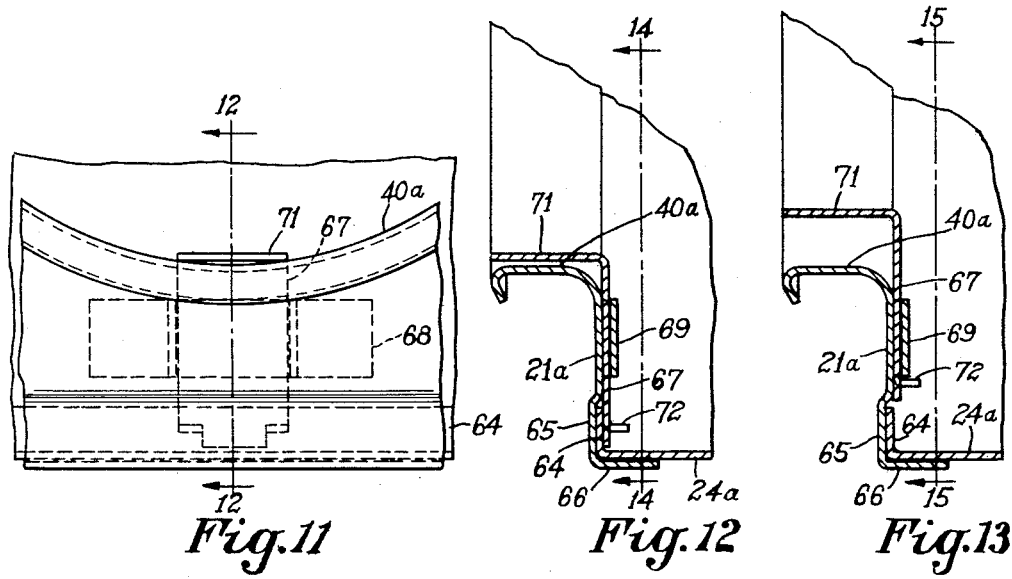
Figures 14, 15:
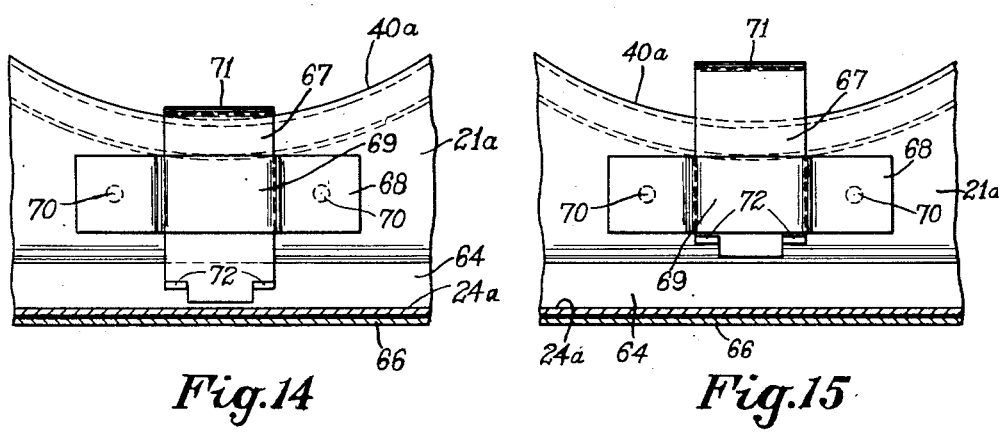
Figure 16:
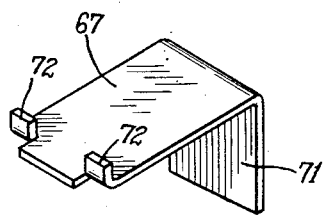
Figure 17:
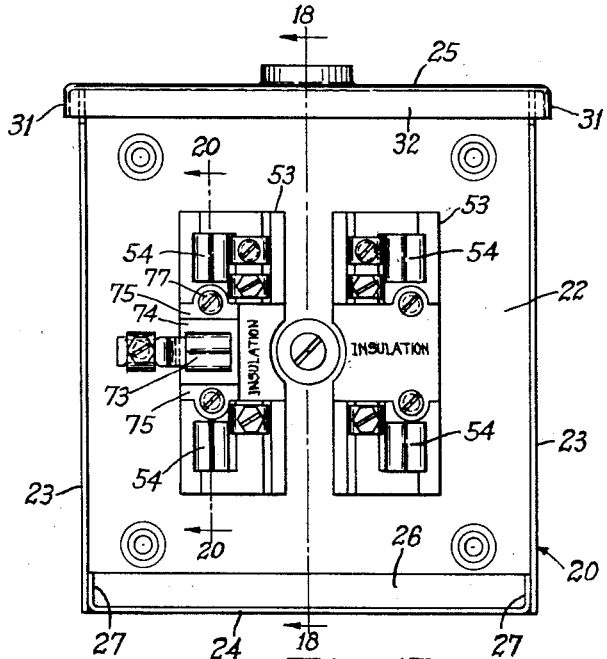
Figure 18:
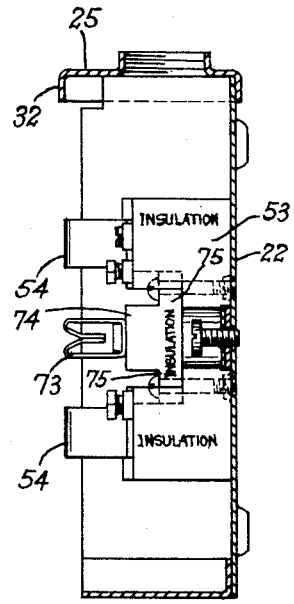
Figure 19:
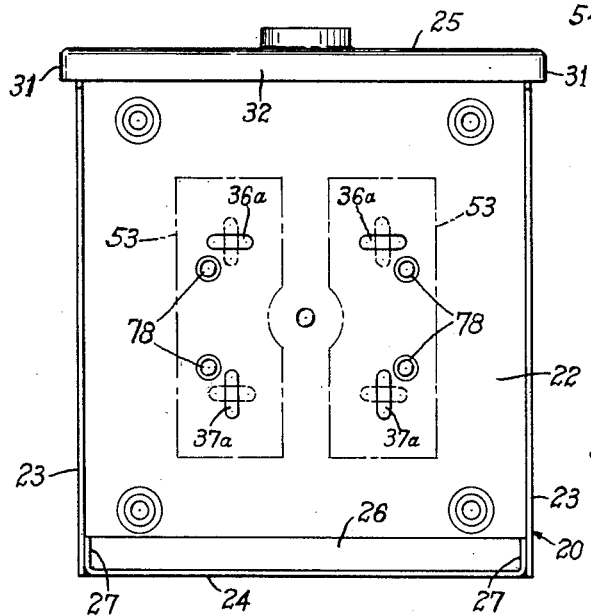
Figure 20:
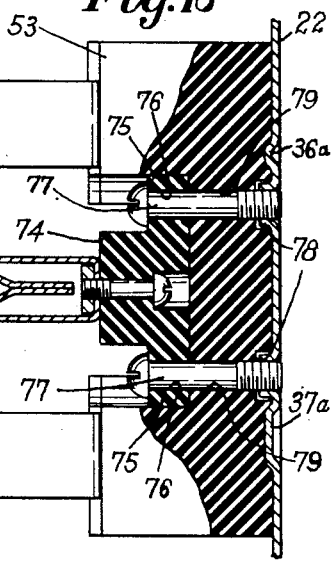

The above objects together with others which will be apparent from the drawings and following description, or which may be later referred to, may be attained by constructing the improved socket meter box and closure therefor in the manner hereinafter described in detail and illustrated in the accompanying drawings, in which:

Figure 1 is a front elevation of a socket meter box embodying the invention, with the cover or closure mounted thereon and detachably connected thereto, parts being broken away for the purpose of illustration;

Fig. 2, a transverse sectional view through the improved socket meter box, taken as on the line 2—2, Fig. 1;

Fig. 3, a longitudinal sectional view through the box, taken as on the line 3—3, Fig. 1;

Fig. 4, a transverse sectional view through the box, taken as on the line 4—4, Fig. 1;

Fig. 5, an enlarged, fragmentary elevation of a portion of the interior of the cover, or closure, showing the improved latch means for automatically attaching the cover to the box when the cover is placed thereon;

Fig. 6, a side elevation of the box, with parts broken away, showing the manner in which the cover is prevented from coming into contact with the contact jaws of the box during the operation of mounting the cover upon the box or removing it therefrom;

Fig. 7, a front elevation of the box, with the insulation blocks carrying the contact jaws removed for the purpose of illustration, the outlines of the insulation blocks being shown in broken lines to indicate the relation thereof to the locating ribs in the bottom or back wall of the box;

Fig. 8, a section on the line 8—8, Fig. 7, showing portions of the two insulation blocks in section to show the transverse grooves therein which cooperate with the transverse locating ribs in the box;

Fig. 9, a similar section, taken on the line 9—9, Fig. 7, showing the manner in which the longitudinal locating ribs in the box engage the longitudinal grooves in the insulation blocks;

Fig. 10, a fragmentary, perspective view of one corner portion of the cover, showing the lugs which prevent contact of the cover with the contact jaws of the box in placing the cover upon the box or removing it therefrom;

Fig. 11, a fragmentary front elevation of a portion of the box and the corresponding portion of the cover, showing a modified, manually operated latch means for detachably connecting the cover to the box;

Fig. 12, a fragmentary section taken on the line 12—12, Fig. 11;

Fig. 13, a fragmentary sectional view, similar to Fig. 11, showing the manually operated latch means in unlocked position;

Fig. 14, a fragmentary sectional view showing the manually operated latch means in locked position, taken on the line 14—14, Fig. 12;

Fig. 15 a view similar to Fig. 14, showing the manually operated latch means in unlocked position, taken on the line 15—15, Fig. 13;

Fig. 16 a detached, perspective view of the manually operated latch bolt shown in Figs. 11 to 16;

Fig. 17 a front elevation of the socket meter box with the cover removed, showing the insulation blocks mounted therein with the contact jaws thereon, showing a fifth contact jaw mounted upon one block for connection to a potential if desired;

Fig. 18 a vertical section through the box, taken on the line 18—18, Fig 17;

Fig. 19 a front elevation of a modified form of box, with the insulation blocks removed for the purpose of illustration, the outlines of the insulation blocks being shown in broken lines to indicate the relation thereof to a modified arrangement of locating means on the back wall of the box; and Fig. 20 an enlarged, sectional view through one of the insulation blocks with the fifth contact jaw connected thereto, taken on the line 20—20, Fig. 17.

Referring now more particularly to the embodiment of the invention as illustrated in Figs. 1 to 10, showing the improved socket meter box with means for preventing short circuiting of the contact jaws through the cover, and illustrating the automatic latch means for detachably connecting the cover to the box, the improved socket meter box to which the invention pertains is indicated generally at 20 and provided with a closure or cover, indicated generally at 21.

This box is preferably made of sheet metal of suitable gauge, and comprises generally the bottom or back wall 22 and side walls 23 which may be formed integrally therewith, and the lower and upper end walls 24 and 25 respectively.

As shown in the drawings, the lower end wall 24 may have the flanges 26 and 27 formed integrally therewith and adapted to lie within, and be welded to, the adjacent end portions of the back wall 22 and side walls 23, as indicated at 28 and 29 respectively.

The upper end wall 25 has the integral flanges 30 and 31 located over the adjacent end portions of the bottom wall 22 and side walls 23 respectively, and welded thereto. An overhanging flange 32, of greater width than the box, is formed at the front edge of the end wall 25, spaced above and overhanging the adjacent end portions of the side walls 23, and, as best shown in Fig. 4, the front or outer end of the walls 25 is similarly shaped, as indicated at 33, and the adjacent portions of the flanges 31 are offset, as at 34, to accommodate the same.

The back wall 22 of the box is provided with a spaced pair of flanged, tapped apertures 35 to receive bolts or screws for attaching the insulation blocks, as will be later explained in detail. On one side of each aperture 35 a transversely disposed locating rib 36 is formed upon the inner surface of the back wall 22, and upon the opposite side of each aperture 35 a longitudinally disposed locating rib 37 is formed on the interior of the back wall. The upper, outer edge of each side wall 23 of the box is notched, as at 38, for a purpose to be later described.

The cover or closure 21 is provided with the usual ring flange 39, defining a circular opening 40 located through the cover and adapted to receive a detachable electric instrument, such as a watt hour meter, or the like, in usual and well known manner.

The cover is provided at its lower end with the inturned flange 41, and with similar flanges 42 at its side edges, adapted to overlie the adjacent portions of the end wall 24 and side walls 23 respectively of the box.

For the purpose of detachably connecting the cover to the box, without requiring the conventional bridge bar and bolts or screws for detachably connecting them to the insulation blocks, latch means such as shown in detail in Fig. 5 is provided.

This latch means includes the bracket plate 43, attached to the underside of the cover, adjacent to the flange 41 thereof, as by the screws 44, and provided with the inturned flange 45, parallel with the flange 41 of the cover and spaced therefrom a sufficient distance to receive the outer end portion of the end wall 24 of the box therebetween, as shown in Figs. 1 and 3.

The latch bolt 46 has a leaf spring 47 formed integral therewith, or rigidly attached thereto, and connected to the flange 45 of the bracket, by welding or the like, at the point indicated at 48. This latch bolt extends through a notch 49 in the adjacent end of the flange 45 of the bracket, and the free end thereof, is bevelled as shown at 50 and is adapted to be received through the opening 51 in the end wall 24 of the box, as shown in Figs. 1 and 3, in order to lock the cover upon the box.

A stop lug 52 may be provided upon the bracket 43 for limiting the outer movement of the latch bolt and spring when the same is manually unlocked.

As in usual practice, insulation blocks, indicated generally at 53, are located within the box for supporting the conventional contact jaws 54 which receive the contact blades of the meter.

Under present practice these insulation blocks are usually mounted upon metal brackets, which are sufficiently resilient to permit some slight movement of the insulation blocks toward or from each other in order to accurately position the contact jaws when the usual bridge bar of the cover is attached to the insulation blocks by bolts, screws, or the like, as above referred to.

However, for the purpose of the present invention such metal brackets are unnecessary and the insulation blocks 53 may be connected directly to the back wall 22 of the box, by means of the bolts or screws 55, located through the countersunk openings 56 in the insulation blocks, and through the apertures 35 in the back wall 22 of the box.

The insulation blocks are properly positioned by means of the transverse and longitudinal grooves 57 and 58 respectively, formed in the back faces of said blocks and receiving the transverse and longitudinal locating ribs, 36 and 37 respectively, formed in the back wall 22 of the box.

As best shown in Figs. 2 and 3, this construction permits the socket meter box to be of considerably less depth than the conventional box in which the insulation blocks are mounted upon metal brackets, as above referred to.

The usual terminals, for connecting line and load contacts to the contact jaws 54, are indicated generally at 59 and may be of any usual and well known construction.

The usual countersunk openings 60 may be formed in the corner portions of the back wall 22, for receiving screws, as indicated at 61, to attach the box to a wall or other vertical support in the position shown in Figs. 3 and 6.

For the purpose of preventing contact of the cover with the contact jaws 54 of the box, when the cover is being placed upon or removed from the box, an inturned lug 63 is formed at the upper end of each side flange 42 of the cover, these lugs being of less height than the flanges 42, as best shown in Figs. 6 and 10.

As shown in Fig. 6, when the cover is being placed upon or removed from the box, the lugs 63 will ride upon the outer edges of the side walls 23 of the box, holding all portions of the cover outwardly away from the contact jaws 54, so that no contact can be made between any part of the cover and the contact jaws.

The side flanges 42 of the cover, overhanging the outer sides of the side walls 23 of the box, will prevent the cover from slipping off of the edge of either side wall 23 of the box and inwardly into contact with the contact jaws 54, as the cover is moved into closed or open position.

As best shown in Fig. 3, the lugs 63 will drop into the notches 38, in the upper ends of the side walls 23, and as the cover is placed tightly upon the box, the spring 47 will project the latch bolt 46 through the opening 51, in the lower end wall 24 of the box, securely locking the cover in position upon the box.

When it is desired to remove the cover from the box, after the meter has been removed, the latch bolts 46 may be withdrawn, by reaching through the opening 40 of the cover with one finger and pressing the latch bolt toward the stop lug 52, so as to withdraw the bevelled end thereof from engagement with the aperture 51 in the lower end wall 24 of the box, when the cover may be easily removed from the box.

In Figs. 11 to 16 is shown a modified form of latch means for detachably connecting the cover to the box. Both the box and the cover may be constructed in the manner illustrated in Figs. 1 to 10, and as described in detail above, with the exception that the lower end wall 24a of the box is provided with an upturned, angular flange 64, and the lower end portion of the cover 21a is outwardly offset, as at 65, to accommodate the flange 64, and preferably provided with the inturned flange 66 adapted to overlie the lower end wall 24a of the box.

The latch device shown in these figures of the drawings is manually operated and comprises the slidable latch bolt 67, slidably located through the keeper 68, having the central offset portion 69 to receive the latch bolt and being welded, or otherwise attached, to the underside of the cover 21a as indicated at 70.

The upper end of the latch bolt 67 is bent at right angles, forming an operating handle 71, disposed within the central opening 40a of the cover so that it may be manipulated by the fingers to move the latch bolt into locked position, behind the flange 64 of the box, as shown in Figs. 12 and 14, or to unlocked position, out of engagement with said flange, as shown in Figs. 13 and 15.

For the purpose of preventing the latch bolt 67 from being entirely withdrawn from the keeper 68, stop lugs 72 are formed at the forward end portion thereof, and are inwardly disposed, so as to contact the keeper when the latch bolt is withdrawn to unlocked position, as shown in Figs. 13 and 15.

Referring now to Figs. 17 to 20, a slight modification is shown, in which a fifth contact jaw, as indicated at 73, may be mounted upon either of the insulation blocks 53 as desired. For this purpose the blocks 53 may be made the same as shown in the other figures of the drawings and the contact jaws 54 are mounted thereon in the same manner.

The fifth contact jaw 73, which may be provided for the attachment of a potential or the like, is fixed upon a small insulation block 74, having the oppositely extending ears 75 provided with apertures 76 therethrough. The blocks 53 are arranged to be attached to the back wall 22 of the box by a pair of screws 77, instead of the single screw 55 as shown in the other figures of the drawings.

These screws 77 engage the tapped, flanged apertures 78 in the back wall of the box. The apertures 76, in the ears 75 of the fifth contact block 74, register with the apertures 79 in the block 53, so that the single screws 77 attach both the block 74 and the corresponding block 53 to the back wall of the box, as clearly shown in Fig. 20.

The locating means for this form of the invention is slightly changed from that shown in Figs. 7, 8 and 9. This locating means comprises either a horizontally, or vertically disposed rib 36a formed in the back wall 22 of the box adjacent each of the upper apertures 78, and a vertically, or horizontally disposed rib 37a, located adjacent to each of the lower apertures 78, as best shown in Figs. 19 and 20. Otherwise the construction of the invention, as shown in Figs. 17 to 20, may be the same as shown in Figs. 1 to 6 and 10 to 16 inclusive.

From the above it will be obvious that a simple, efficient and economical socket meter box is provided, having means thereon for detachably locking the cover upon the box, and for accurately positioning the contact jaws in position to receive the contact blades of the meter, without requiring the use of the conventional bridge bar and bolts or screws, or the conventional metal brackets for mounting the insulation blocks in the box; and furthermore, that the box and cover are provided with simple and effective means for preventing contact of the cover with the energized contact jaws of the box, when the cover is being placed upon the box or removed therefrom.

We claim:

1. A socket meter box for detachably receiving a detachable electrical instrument of the type having externally projecting contact blades, said box comprising a back wall and side walls and having insulation means therein carrying contact jaws for detachably receiving the contact blades of the electrical instrument and a detachable cover having an entirely unobstructed opening therein designed to be closed by such a detachable electrical instrument, a flange on one side wall of the box overhanging the adjacent end portion of the cover, and spring loaded latch means on the underside of the opposite end portion of the cover for automatically detachably connecting the cover to the box independently of said insulation means, when the cover is placed upon the box, said latch means being accessible only through said opening in the cover when the electrical instrument is removed therefrom.

2. A socket meter box for detachably receiving a detachable electrical instrument of the type having externally projecting contact blades, said box comprising a back wall and side walls and having insulation means therein carrying contact jaws for detachably receiving the contact blades of the electrical instrument and a detachable cover having an entirely unobstructed opening therein designed to be closed by such a detachable electrical instrument, a flange on one side wall of the box overhanging the adjacent end portion of the cover, and manually operated latch means mounted on the underside of the opposite end portion of the cover for detachably connecting the cover to the box independently of said insulation means, said latch means being accessible only through said opening in the cover when the electrical instrument is removed therefrom.

3. A socket meter box for detachably receiving a detachable electrical instrument of the type having externally projecting contact blades, said box comprising a back wall and side walls and having insulation means therein carrying contact jaws for detachably receiving the contact blades of the electrical instrument and a detachable cover having an entirely unobstructed opening therein designed to be closed by such a detachable electrical instrument, a flange on one side wall of the box overhanging the adjacent end portion of the cover, and a spring loaded latch bolt with a bevelled end on the underside of the opposite end portion of the cover for automatically detachably connecting the cover to the box independently of said insulation means, when the cover is placed upon the box, said latch bolt being accessible only through said opening in the cover when the electrical instrument is removed therefrom.

4. A socket meter box for detachably receiving a detachable electrical instrument of the type having externally projecting contact blades, said box comprising a back wall and side walls and having insulation means therein carrying contact jaws for detachably receiving the contact blades of the electrical instrument and a detachable cover having an entirely unobstructed opening therein designed to be closed by such a detachable electrical instrument, means on one side wall of the box engaging the adjacent end portions of the cover, and latch means on the underside of the opposite end portion of the cover for detachably connecting the cover to the box independently of said insulation means, said latch means being accessible only through said opening in the cover when the electrical instrument is removed therefrom.

5. A socket meter box for detachably receiving a detachable electrical instrument of the type having externally projecting contact blades, said box comprising a back wall, side walls and detachable cover having an entirely unobstructed opening therein designed to be closed by such a detachable electrical instrument, a flange on one side wall of the box overhanging the adjacent end portion of the cover, a flange on the opposite side wall of the box underlying the adjacent end portion of the cover, a keeper attached to the underside of the cover, and a latch bolt on the underside of the cover slidably mounted through said keeper and adapted to engage beneath said last named flange for detachably connecting the cover to the box, said latch bolt being accessible only through said opening in the cover when the electrical instrument is removed therefrom.

6. A socket meter box for detachably receiving a detachable electrical instrument of the type having externally projecting contact blades, said box comprising a back wall, side walls and detachable cover having an entirely unobstructed opening therein designed to be closed by such a detachable electrical instrument, a flange on one side wall of the box overhanging the adjacent end portion of the cover, a flange on the opposite side wall of the box underlying the adjacent end portion of the cover, a keeper attached to the underside of the cover, and a latch bolt on the underside of the cover slidably mounted through said keeper and adapted to engage beneath said last named flange, and having an angular handle portion extending into said opening for manually operating the latch bolt, and stop lugs formed upon the outer end of the latch bolt for contact with the keeper to limit the opening movement of the latch bolt, said latch bolt being accessible only through said opening in the cover when the electrical instrument is removed therefrom.

References Cited in the file of this patent

UNITED STATES PATENTS

| Number | Name | Date |
|---|---|---|
| 831,476 | Ryan | Sept. 18, 1906 |
| 890,851 | Durfee | June 16, 1908 |
| 1,410,035 | Regan | Mar. 21, 1922 |
| 1,796,932 | Johansson | Mar. 17, 1931 |
| 2,182,603 | Walker et al. | Dec. 5, 1939 |
| 2,250,977 | Walker | July 29, 1941 |
| 2,270,228 | Palmer | Jan. 20, 1942 |
| 2,329,349 | Johansson | Sept. 14, 1943 |